(12) United States Patent
Ishizumi et al.

(10) Patent No.: US 7,382,426 B2
(45) Date of Patent: Jun. 3, 2008

(54) LIQUID CRYSTAL DISPLAY UNIT HAVING BACK-LIGHT WITH FLUORESCENT TUBES AND FRESNEL LENS WITH LONGITUDINAL CUTS PERPENDICULAR TO TUBES

(75) Inventors: Takashi Ishizumi, Nara (JP); Motohiro Yamahara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 211 days.

(21) Appl. No.: 10/547,973

(22) PCT Filed: Apr. 21, 2004

(86) PCT No.: PCT/JP2004/005754

§ 371 (c)(1),
(2), (4) Date: Sep. 7, 2005

(87) PCT Pub. No.: WO2004/095119

PCT Pub. Date: Nov. 4, 2004

(65) Prior Publication Data

US 2006/0170841 A1 Aug. 3, 2006

(30) Foreign Application Priority Data

Apr. 22, 2003 (JP) .............................. 2003-116687

(51) Int. Cl.
G02F 1/1335 (2006.01)

(52) U.S. Cl. ..................... 349/112; 349/70; 349/95; 349/113

(58) Field of Classification Search ............... 349/70, 349/95, 112, 113
See application file for complete search history.

(56) References Cited

U.S. PATENT DOCUMENTS 4,704,004 A * 11/1987 Nosker ...................... 349/67
6,741,306 B2 * 5/2004 Maruyama et al. ......... 349/112
6,933,994 B1 8/2005 Kaneko et al.
2001/0043302 A1 11/2001 Inoue et al.
2003/0081320 A1 5/2003 Sakai et al.
2003/0117707 A1 6/2003 Uchida et al.
2006/0274246 A1 12/2006 Inoue et al.

FOREIGN PATENT DOCUMENTS

| JP | 2000-338311 | 12/2000 |
|---|---|---|
| JP | 2001-141912 | 5/2001 |
| JP | 2001-343646 | 12/2001 |
| JP | 2002-189105 | 7/2002 |
| JP | 2002-267812 | 9/2002 |
| JP | 2002-278470 | 9/2002 |
| JP | 2002-372713 | 12/2002 |
| JP | 2003-202416 | 7/2003 |

* cited by examiner

*Primary Examiner*—David Nelms
*Assistant Examiner*—John Heyman
(74) *Attorney, Agent, or Firm*—Keating & Bennett, LLP (57) ABSTRACT

A liquid crystal display unit is characterized by comprising a liquid crystal display panel, a back-light instrument for outputting light to the liquid crystal display panel, and a scattering-anisotropic optical instrument disposed on that side of the liquid crystal display panel which is opposite to the back-light instrument. The scattering-anisotropic optical instrument is so formed that the scattering intensity of light vertically entering the display screen of the liquid crystal panel is maximized. Therefore, the scattering-anisotropic optical instrument can scatter light vertically entering the display screen of the liquid crystal panel to allow a viewer to view a display screen from a wide range of viewing angles. In addition, because the unit does not scatter light entering obliquely, rather than vertically, a display screen but lets the light pass as it is, whitish appearance as is seen in an oblique-direction observation can be prevented. Therefore, whitish appearance can be prevented even if the back-light instrument does not output perfectly parallel light.

9 Claims, 7 Drawing Sheets

SCHEMATIC CROSS
SECTION AT A-A'

CONDENSES A LIGHT WITH A LENS SHEET IN HORIZONTAL
DIRECTION TO THE FLUORESCENCE TUBES

SCHEMATIC CROSS
SECTION AT A-A'

FIG. 13 (a)
CONDENSES A LIGHT WITH A CONDENSING REFLECTION FACE IN THE VERTICAL DIRECTION TO THE FLUORESCENCE TUBES

FIG. 13 (b)
SCHEMATIC CROSS SECTION AT B-B'

LIQUID CRYSTAL DISPLAY UNIT HAVING BACK-LIGHT WITH FLUORESCENT TUBES AND FRESNEL LENS WITH LONGITUDINAL CUTS PERPENDICULAR TO TUBES

BACKGROUND OF THE INVENTION

1. Field of the Invention

The present invention relates to a liquid crystal display unit used in a display device such as a computer, a television receiver, and many others.

2. Description of the Related Art

In a liquid crystal unit used as a television that reproduces moving image, demands for image quality, including a moving image response performance and a contrast, are high. A display unit that tightly holds a negative dielectric anisotropic liquid crystal layer between the substrates opposed to each other and that employs a liquid crystal display panel in which liquid crystal molecules are almost vertically oriented to the substrates when voltage is not applied to the liquid crystal molecules is characterized by its high contrast and high-speed response performance. However, the display unit has a problem of poor display quality. Specifically, because of the high dependency on a viewing angle, transmittance in an oblique direction becomes higher than the one in a vertical direction when watched from an oblique direction, and therefore its tone becomes larger than a desired tone (appears whitish).

This is caused especially by increase of transmittance in an intermediate tone display, in a direction in which a displacement direction of the obliquely inclining liquid crystal molecules is identical with the direction of diffused transmitted light from a back-light.

In this connection, Japanese Patent Application Publication No. 2002-372713 (published on Dec. 26, 2002) suggests a liquid crystal display unit employing a back-light that outputs parallel light to a liquid crystal display panel. The liquid crystal display unit having a high quality display can be achieved by employing a back-light that outputs parallel light so as not to depend on displacement direction of the liquid crystal molecules and so as not to depend on a viewing angle (off tone in certain viewing directions) in a case of an intermediate tone display.

However, currently, it is practically difficult for a back-light to output perfectly parallel light. Besides, even if a back-light can output perfectly parallel light, the cost is so high that it is impractical. Accordingly, the liquid crystal display unit disclosed in Japanese Patent Application Publication No. 2002-372713 has a problem that a whitish appearance (a tone higher than a desired tone) occurs when parallel light output from a back-light is not perfectly parallel.

Generally, for the purpose of increasing a viewing angle, a scattering sheet is disposed in front of a liquid crystal display panel. This scattering sheet is for scattering light to all directions, regardless of the incident angle, e.g. in a front direction and an oblique direction. Light entering the liquid crystal display panel and then entering the scattering sheet disposed in front of the panel is scattered to all directions by this scattering sheet. Because light output in a front direction of the liquid crystal display panel is scattered to all directions, a viewer can observe the light output in the front direction of the liquid crystal display panel, not only in the front direction but also in an oblique direction off to leftward/rightward/upward/downward.

However, this scattering sheet also evenly scatters light, which is output in an oblique direction, to all directions. Therefore, light obliquely going through the liquid crystal display panel can be watched from a wide range of angles. Therefore, the liquid crystal display unit disclosed in Japanese Patent Application Publication No. 2002-372713 has a problem of generating a whitish appearance.

SUMMARY OF THE INVENTION

In order to solve the problems described above, preferred embodiments of the present invention provide a liquid crystal display unit that uses a back-light that does not output perfectly parallel light and that can prevent a whitish appearance of a liquid crystal display panel so as to improve its display quality and to provide a display unit including the liquid crystal display unit.

The liquid crystal display unit according to a preferred embodiment of the present invention includes a liquid crystal display panel, a back-light arranged to output light to the liquid crystal display panel, and a scattering-anisotropic optical element disposed on a side of the liquid crystal display panel opposite to the back-light and is arranged such that a scattering intensity of light vertically entering a display screen of the liquid crystal display panel is maximized.

In the above-described structure, the light output from the back-light goes through the liquid crystal display panel and then enters the scattering-anisotropic optical element. The scattering-anisotropic optical element is arranged such that the scattering intensity of light vertically entering the display screen of the liquid crystal panel is maximized. Therefore, the scattering-anisotropic optical element can scatter light vertically entering the display screen of the liquid crystal panel to allow a viewer to watch a display screen at a wide viewing angle. In addition, because the scattering-anisotropic optical element does not scatter light entering obliquely, rather than vertically, a display screen lets the light pass as it is, a whitish appearance that occurs when a viewer watches from an oblique direction can be prevented. Therefore, although the back-light does not output perfectly parallel lights, a whitish appearance can be prevented.

Accordingly, in the above-described structure, a back-light that does not output perfectly parallel light can be used, and a whitish appearance on the liquid crystal display panel is prevented so as to improve the display quality of the liquid crystal display unit.

Further, in a liquid crystal display unit according to a preferred embodiment of the present invention, it is preferable that the back-light includes a plurality of fluorescent tubes and reflectors and that the plurality of fluorescent tubes and the reflectors be disposed substantially parallel to the display screen in the liquid crystal display panel.

In the above-described structure, even a simply structured back-light, such as a back-light including a plurality of fluorescent tubes and reflectors, can prevent a whitish appearance and can provide a liquid crystal display unit with an excellent display quality.

Further, in a liquid crystal display unit according to a preferred embodiment of the present invention, it is preferable that the scattering-anisotropic optical element include an interior scattering layer having a transparent matrix and dispersion material particles, and a layer having a concavo-convex surface, and in the transparent matrix in the interior scattering layer, dispersion material particles, each having an anisotropic shape and a refractive index different from a refractive index of the transparent matrix, are arranged so as to be substantially parallel to each other.

In the above-described structure, in the transparent matrix in the interior scattering layer, dispersion material particles, each having an anisotropic shape and a refractive index different from a refractive index of the transparent matrix, are dispersed so as to be substantially parallel to each other. Therefore, a haze caused by the interior scattering layer and a haze caused by the concavo-convex surface can be controlled respectively and accurately, and it enables to design in such a way to provide an antidazzling effect without decreasing the sharpness of the transmission image.

Further, it is preferable that the dispersion material particles be spheroid shaped in the transparent matrix and that the dispersion material particles be arranged in such a way that a long axial direction of the spheroid-shaped dispersion material particles are vertical relative to the display screen in the liquid crystal display panel.

In the above-described structure, an effective size of the dispersion material particle to light obliquely entering the interior scattering layer is larger than an effective size of the dispersion material particle to light entering the interior scattering layer from a front direction. Therefore, light entering from an oblique direction is narrowly scattered, and light entering from a front direction is widely scattered.

Accordingly, the scattering-anisotropic optical element in the liquid crystal display unit according to a preferred embodiment of the present invention widely scatters light entering from a front direction and narrowly scatters light entering from an oblique direction. In other words, the scattering-anisotropic optical element hardly scatters light entering from an oblique direction, and outputs almost-parallel transmitted light. Therefore, this structure enables to prevent a whitish appearance on the liquid crystal display panel so as to improve the display quality.

Further, because light entering from a front direction is widely scattered and light entering from an oblique direction is narrowly scattered, it is preferable that the ratio between the long axis and the short axis of the spheroid-shaped dispersion material particles be not less than 2 and not more than 20.

In order to solve the above problems, the liquid crystal display unit according to a preferred embodiment of the present invention includes a liquid crystal display panel, a back-light that outputs light to the liquid crystal display panel, and a scattering-anisotropic optical element disposed on a side of the liquid crystal display panel which is opposite to the back-light and that is arranged in such a way in which the scattering intensity of light vertically entering a display screen of the liquid crystal display panel is maximized.

The above-described structure allows a display unit having the above-described liquid crystal display unit to prevent a whitish appearance with a relatively simply structured back-light so as to provide a display device with an excellent display quality.

The display unit according to various preferred embodiments of the present invention can be applied to a television receiver, a DVD player, a video player, or others.

For a fuller understanding of the elements, features, characteristics, nature and advantages of the present invention, reference should be made to the ensuing detailed description of preferred embodiments thereof taken in conjunction with the accompanying drawings.

DETAILED DESCRIPTION OF PREFERRED EMBODIMENTS

Followings describe preferred embodiments of the present invention. The present invention is not to be limited in anyway by the following descriptions.

Figure 1:
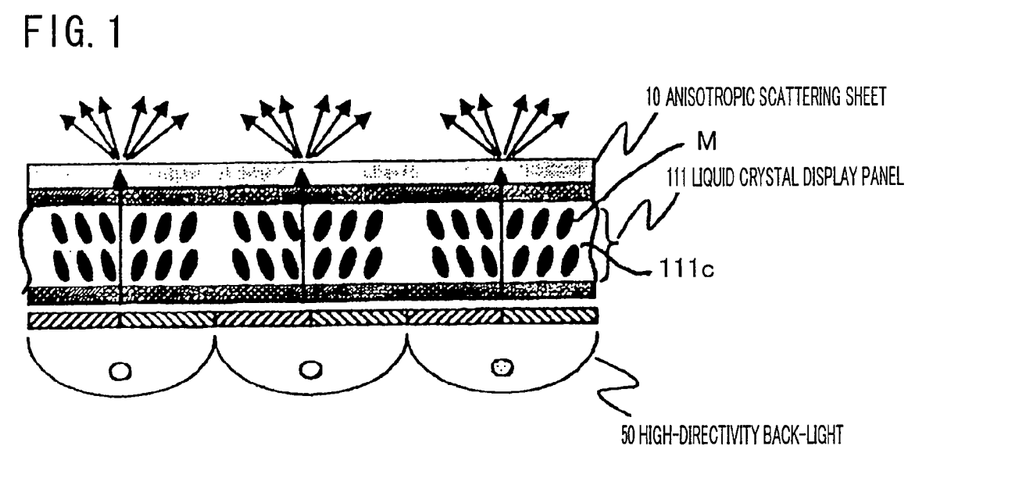
FIG. 1 is a cross section that schematically illustrates a structure of a liquid crystal display unit according to a preferred embodiment of the present invention.

FIG. 1 is a cross section that schematically illustrates a structure of the liquid crystal display unit in the present invention.

As shown in FIG. 1, the liquid crystal display unit in the present invention includes a liquid crystal display panel 111, an anisotropic scattering sheet (a scattering-anisotropic optical element) 10, and a high-directivity back-light 50.

The liquid crystal display panel 111 includes a pair of substrates opposed to each other (a TFT substrate 111a and an opposed substrate 111b), and a liquid crystal layer 111c having negative dielectric anisotropic liquid crystal molecules M. The liquid crystal layer 111c is tightly held by the TFT substrate 111a and the opposed substrate 111b, and this liquid crystal layer 111c is oriented almost vertically to the surface of the TFT substrate 111a and to the surface of the opposed substrate 111b when voltage is not applied. Further, the TFT substrate 111a and the opposed substrate 111b are disposed in such a way that their surfaces are parallel to the display screen of the liquid crystal display panel 111.

Further, the liquid crystal display unit in the present preferred embodiment includes a high-directivity back-light 50 that outputs substantially parallel light to the liquid crystal display panel 111. In the present preferred embodiment, on the liquid crystal display panel 111, the side on which a high-directivity back-light 50 is disposed is indicated as a rear side, and the opposite side is indicated as a front side. In the liquid crystal display device in the present preferred embodiment, the front side face of the liquid crystal display panel is a display screen.

Anything that can output substantially parallel light to the liquid crystal display panel 111 can be employed as the high-directivity back-light 50. An example of the high-directivity back-light 50 is the one including components such as a fluorescent tube and a reflector.

Further, an anisotropic scattering sheet 10 is disposed on the front side of the liquid crystal display panel 111. The anisotropic scattering sheet 10 widely scatters light that is output in a front direction from the liquid crystal display panel 111 while narrowly scatters light that is output in an oblique direction from the liquid crystal display panel 111. In other words, the anisotropic scattering sheet 10 is so formed that the scattering intensity of light vertically entering the display screen of the liquid crystal panel 111 is maximum. In the present preferred embodiment, the vertical direction to the display screen of the liquid crystal display panel 111 is indicated as a front direction, and the direction inclined a certain angle with respect to the front direction is indicated as an oblique direction.

Followings further describes in detail respective concrete examples of the liquid crystal display panel 111, the anisotropic scattering sheet 10, and the high-directivity back-light 50 in the liquid crystal display unit in the present preferred embodiment.

In the liquid crystal display unit in the present preferred embodiment, a liquid crystal display panel in a vertical orientation mode is employed as the liquid crystal display panel 111. In the liquid crystal display panel in a vertical orientation mode, when voltage is not applied, the liquid crystal molecules substantially vertically orient to a substrate, and the liquid crystal molecules in a vertical orientation incline in accordance with the voltage applied from a pixel PIX(i,x) to a liquid crystal capacity CL(i,j). Further, in the present preferred embodiment, the liquid crystal display panel in a vertical orientation mode adopts a normally black mode (a mode in which a display is in black when voltage is not applied)

Figure 2:
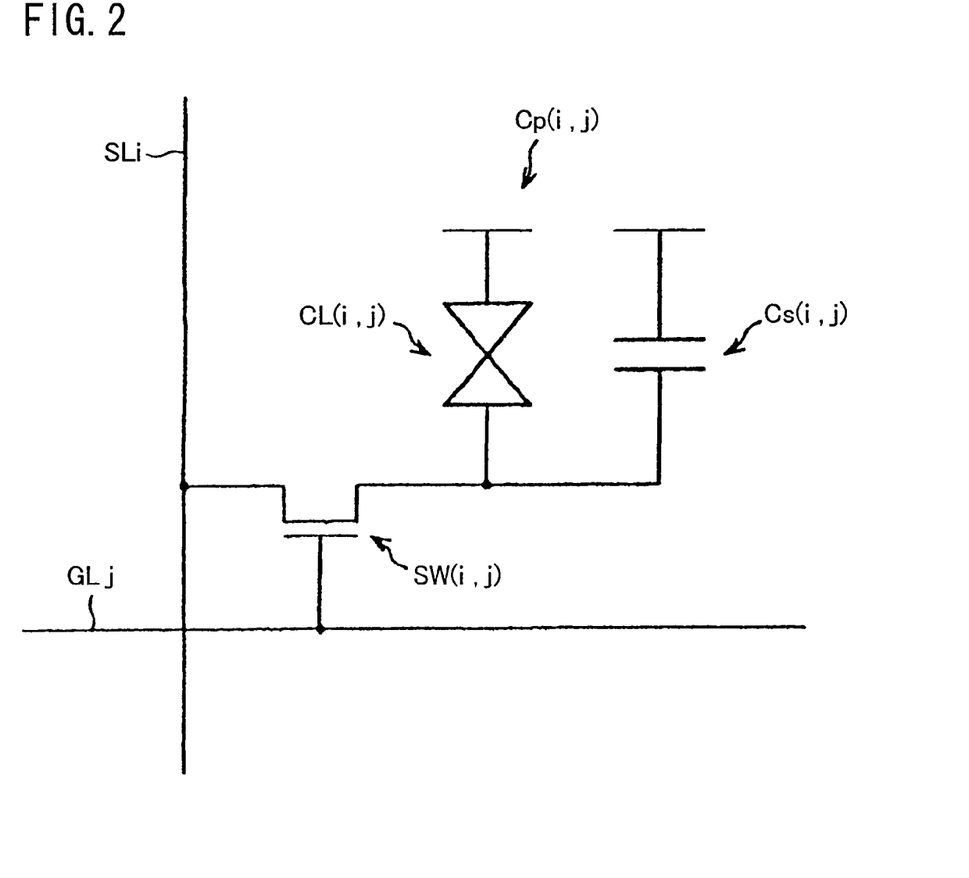
FIG. 2 is a circuit diagram that illustrates a structure of a pixel in a liquid crystal display unit according to a preferred embodiment of the present invention.

An example of the pixel PIX(i,j) is a switching element shown in FIG. 2. This switching element, as shown in FIG. 2, includes a field effect transistor SW(i,j) and a pixel capacity Cp(i,j). The gate of the field effect transistor SW(i,j) is connected to a scanning signal wire GLj, and at the same time, the drain of the field effect transistor SW(i,j) is connected to a data signal wire SLi. Further, an electrode (below mentioned pixel electrode 121a) of the pixel capacity Cp(i,j) is connected to the source of the field effect transistor SW(i,j). Further, an opposed electrode (below mentioned opposed electrode 121b) of the pixel capacity Cp(i,j) is connected to a common electrode wire that is common in all pixels PIXs. The pixel capacity Cp(i,j) includes a liquid crystal capacity CL(i,j) and a supplemental capacity Cs(i,j). The supplemental capacity Cs(i,j) is added upon necessity.

In the pixel PIX(i,j), when the scanning signal wire GLj is selected, the field effect transistor SW(i,j) turns on, and the voltage applied to the data signal wire SLi is applied to the pixel capacity Cp(i,j). After the selection of the scanning signal wire GLj is terminated, and while the field effect transistor SW(i,j) is being turned off, the pixel capacity CP(i,j) keeps the voltage when the field effect transistor SW(i,j) is turned off. At this time, transmittance of the liquid crystal layer 111c shifts in accordance with the voltage applied to the liquid crystal capacity CL(i,j). Therefore, the display state of the pixel PIX(i,j) can be shifted in accordance with the picture data D by selecting the scanning signal wire GLj and then applying voltage in accordance with the picture data D to be transmitted to the pixel PIX(i,j) to the data signal wire SLi, so that liquid crystal display is realized.

Figure 3:
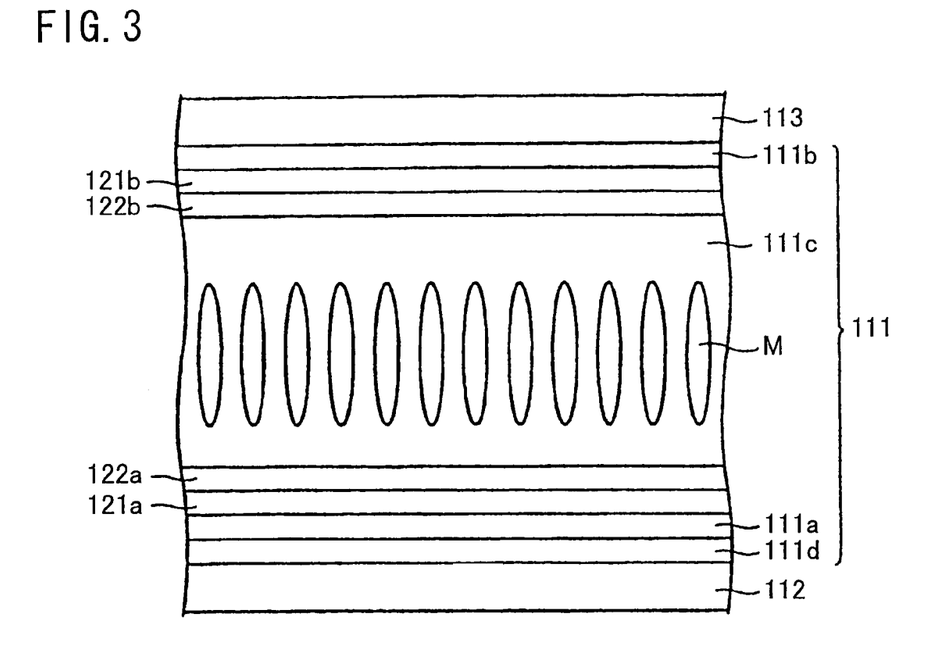
FIG. 3 is a pattern diagram that illustrates a liquid crystal display panel in a liquid crystal display unit according to a preferred embodiment of the present invention under a condition in which voltage is not applied.
Figure 4:
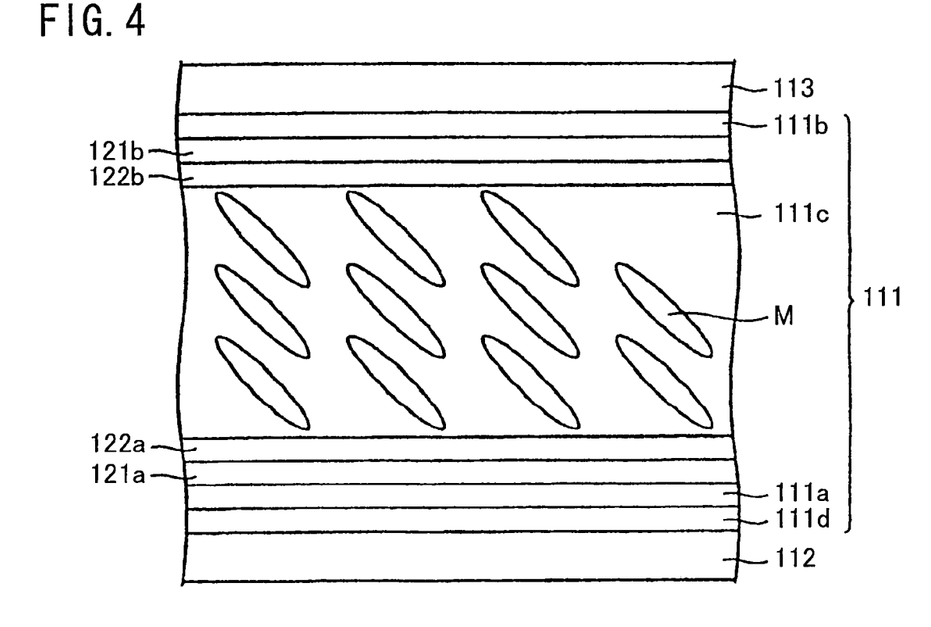
FIG. 4 is a pattern diagram that illustrates the liquid crystal display panel included in the liquid crystal display unit according to a preferred embodiment of the present invention under a condition in which voltage is applied.

Followings describe a structure of the liquid crystal display panel 111 in the liquid crystal display in the present preferred embodiment, with reference to FIG. 3 and FIG. 4.

As mentioned above, the liquid crystal display panel 111 is a liquid crystal display panel in a vertical orientation mode. As shown in FIG. 3, a polarizer 112 and a polarizer 113 are disposed on the both sides, the front side and the rear side, of the liquid crystal display panel 111.

The liquid crystal display panel 111 includes a TFT (Thin Film. Transistor) substrate 111a, an opposed substrate 111b, and a liquid crystal layer 111c which is made of negative dielectric anisotropic nematic liquid crystal and is sandwiched between the substrates 111a and 111b. The liquid crystal display unit in the present preferred embodiment can reproduce color images, and a color filter (not shown in Figures) is correspondingly disposed to a color of each pixel PIX(i,j) on the opposed substrate 111b. Besides, pixel electrodes 121a corresponding to respective pixels PIX(i,j) are disposed on the TFT (Thin Film Transistor) substrate 111a, and an opposed electrode 121b is disposed on the opposed substrate 111b.

Further, a vertical orientation layer 122a and a vertical orientation layer 122b are disposed on the mutually opposed surfaces of the TFT substrate 111a and the opposed substrate 111b, respectively. In other words, the vertical orientation layer 122a is disposed on the liquid-crystal-layer-111c-side surface of the TFT substrate 111a, and the vertical orientation layer 122b is disposed on the liquid-crystal-layer-111c-side surface of the opposed substrate 111b. With this, the liquid crystal molecules M in the liquid crystal layer 111c that is disposed in between the TFT substrate 111a and the opposed substrate 111b are substantially vertically oriented with respect to the surfaces of the TFT substrate 111a and the opposed substrate 111b, even when voltage is not applied in between the pixel electrode 121a and the opposed electrode 121b.

On the other hand, when voltage is applied in between the pixel electrode 121a and the opposed electrode 121b, the liquid crystal molecules M that are substantially vertically oriented to the surfaces of the TFT substrate 111a and the opposed substrate 111b (in a voltage-not-applied-mode) become obliquely oriented at an angle corresponding to the applied voltage (in a voltage-applied-mode), as shown in FIG. 4. Because the TFT substrate 111a and the opposed substrate 111*b* are opposed to each other, a normal line direction and an in-plane direction of the TFT substrate 111*a* and the opposed substrate 111*b* are simply indicated as a normal line direction and an in-plane direction in the present preferred embodiment, except for a case in which differentiation is necessary.

In the liquid crystal display unit in the present preferred embodiment, the liquid crystal display panel 111 is a multi-domain aligned liquid crystal display panel. In other words, in the liquid crystal display panel 111, each pixel PIX(i,j) is divided into a plurality of areas (domains), and the orientation in a voltage-applied-mode, specifically, the direction to which the liquid crystal molecules M incline when voltage is applied (an in-plane direction element of the orientation) is controlled so as to differ in each domain. Followings describe, with reference to FIG. 5, an example of a structure of such multi-domain aligned liquid crystal display panel.

Figure 5:
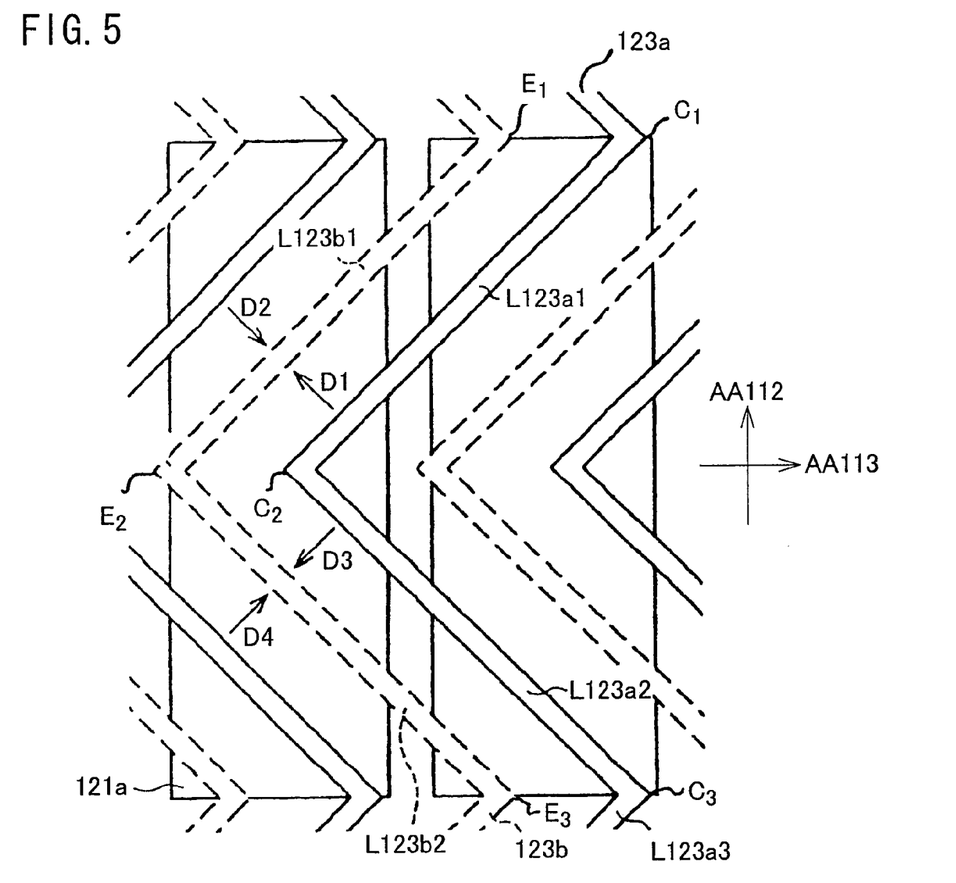
FIG. 5 is a plan view that illustrates a structure of a liquid crystal display panel included in the liquid crystal display unit according to a preferred embodiment of the present invention.

Specifically, as shown in FIG. 5, a series of protrusions 123*a* are formed in stripe in the pixel electrode 121*a*. In addition, the series of protrusions 123*a* are with a chevron cross section and a zigzag in-plane-direction-shape, and each corner section is at a substantially right angle. In other words, the series of protrusions 123*a*, as shown in FIG. 5, include line sections L123*a*1 through L123*an* and corner sections $C_1$ through $C_n$ that are corners between the line sections. The line section L123*an* indicates the section in between the corner section $C_{n-1}$ and the corner Section $C_n$ in the series of protrusions 123*a*.

On the other hand, in the opposed electrode 121*b*, slits (apertures: sections without an electrode) 123*b* are formed in stripe. In addition, the slits 123*b* is with a zigzag in-plane-direction shape and each corner section is at a substantially right angle. In other words, the slits 123*b*, as shown in FIG. 5, include line portions L123*b*1 through L123*bn* and corner sections $E_1$ through $E_n$ that are corners between the line sections. The line portion L123*bn* indicates the section in between the corner section $E_{n-1}$ and the corner section $E_n$ in the slits 123*b*.

In the liquid crystal display panel 111, as shown in FIG. 5, the series of protrusions 123*a* in the pixel electrode 121*a* and the slits 123*b* in the opposed electrode 121*a* are disposed so as to mesh with one another. In other words, in the liquid crystal display panel 111, line portions L123*a*1 through L123*an* in the series of protrusions 123*a* and line portions L123*b*1 through L123*bn* in the slits 123*b* are disposed parallel to each other. A width of a space between one protrusion 123*a* and a slit 123*b* in the in-plane direction is determined in advance.

The series of protrusions 123*a* are formed by embrocating a photopolymer on the pixel electrodes 121*a* and carrying out a photolithography process. Further, the pixel electrodes 121*a* and the opposed pixel electrode 121*b* are formed in the steps of; forming ITO (Indium Tin Oxide) films on the TFT substrate 111*a* and the opposed substrate 111*b*; embrocating a photoresist on each of the ITO films; and exposing, developing, and etching electrode patterns. In addition, the slits 123*b* are formed by carrying out patterning in such a way to exclude the sections of the slits 121*b*, when the opposed electrode 121*b* is formed.

At the same time, in the neighborhood of the series of protrusions 123*a*, the liquid crystal molecules M are oriented to be vertical to the slope. In addition, when voltage is applied, an electric field in the neighborhood of the series of protrusions 123*a* inclines to be parallel to the slope of the series of protrusions 123*a*. At this time, the liquid molecules M incline to the direction in which their long axes are vertical to the electrode field. Therefore, the liquid crystal molecules M obliquely orient to the substrate surface. Further, on account of the liquid crystal continuity, the liquid crystal molecules M apart from the slope of the series of protrusions 123*a* also orient to the same direction as the ones in the neighborhood of the slope.

Similarly, in the neighborhood of the edges of the slits 123*b* (a boundary between the slits 123*b* and the opposed electrode 121*b*), when voltage is applied, an electric field inclined to the substrate surface is formed, and therefore the liquid crystal molecules M obliquely orient to the substrate surface. Further, on account of the liquid crystal continuity, the liquid crystal molecules apart from the region neighboring the edges also orient to the same orientation as the ones in the neighborhood of the edges.

As a result, when voltage is applied, in the regions in between the line portions L123*a*1 through L123*an* in the series of protrusions 123*a* and the line portions L123*b* through L123*bn* in the slits 123*b*, the in-plane direction element of the orientation direction of the liquid crystal molecules M matches with the in-plane direction element of the direction from the line portions L123*a*1 through L123*an* to the line portions L123*b* through L123*bn*.

At this time, the series of protrusions 123*a* and the slits 123*b* are curved at a substantially right angle at the corner sections C1 through Cn and the corner sections E1 through En, respectively. Accordingly, when voltage is: applied, an orientation direction of the liquid crystal molecules is divided into four in the pixel PIX(i,j). As a result, domains D1-D4, each having a different orientation direction of liquid crystal molecules, are formed in the pixel PIX(i,j).

On the other hand, the polarizer 112 and the polarizer 113 are disposed in such a way that an absorption axis AA112 of the polarizer 112 is orthogonal to an absorption axis AA113 of the polarizer 113. Further, the polarizer 112 and the polarizer 113 are disposed in such a way that their absorption axes AA112 and AA113 are disposed to form a 45-degree-angle with the in-plane direction element of the orientation direction of the liquid crystal molecules M in the domains D1-D4, when voltage is applied.

In the liquid crystal display panel 111 with the foregoing structure, while voltage is applied in between the pixel electrodes 121*a* and the opposed electrode 121*b*, the liquid crystal molecules M in the liquid crystal layer 111*c*, as shown in FIG. 4, are oriented at an angle corresponding to the applied voltage, with respect to the normal line on the surface of the TFT substrate 111*a*. With this, in the liquid crystal display unit in the present preferred embodiment, a phase contrast corresponding to the applied voltage is imparted to light passing through the liquid crystal display panel 111.

Further, the absorption axes AA112 and AA113 of the respective polarizers 112 and 113 are disposed to be orthogonal to each other. Therefore, the light entering the polarizer on the output side (for example, the polarizer 112) becomes elliptically-polarized light corresponding to the phase contrast given by the liquid crystal display panel 111, and a part of the entering light goes through the polarizer 112. As a result, the amount of the light output from the polarizer 112 can be controlled in accordance with the applied voltage, and therefore a tone display can be accomplished.

Further, in the liquid crystal display panel 111, domains D1-D4, whose orientation directions of liquid crystal molecules are different from each other, are formed in a pixel. Therefore, in the case in which the liquid crystal molecules cannot give a phase contrast to the transmitted light as a result that a viewer views the liquid crystal display panel 111 from a direction parallel to the orientation direction of the liquid crystal molecules M that belong to a domain (for example, D1), the liquid crystal molecules in the rest of the domains (in this case, D2-D4) can give a phase contrast to the transmitted light. Therefore, the domains are optically compensable to each other. Consequently, the display quality in the case in which the liquid crystal display panel 111 is viewed from an oblique direction can be improved, and therefore the viewing angle can be increased.

On the contrary, when voltage is not applied in between the pixel electrodes 121a and the opposed electrode 121b, the liquid crystal molecules M in the liquid crystal layer 111c are vertically oriented, as shown in FIG. 3. In this state (when voltage is not applied), a phase contrast is not imparted to the light entering the liquid crystal display panel 111 in the normal line direction by each of the liquid crystal molecules M, and therefore the light goes through the liquid crystal display panel 111 with the polarized state being kept. As a result, the light entering the polarizer on the output side (for example, 112) becomes linearly-polarized light substantially parallel to the absorption axis AA112 of the polarizer 112, and therefore the light cannot go through the polarizer 112. Consequently, the liquid crystal display panel 111 can achieve black display.

As foregoing describes, in the liquid crystal display unit in the present preferred embodiment, voltage is applied in between the pixel electrodes 121a and the opposed electrode 121b so as to generate an electric field that is oblique to the substrate surface, and finally the liquid crystal molecules M are obliquely oriented. This transmittance of the pixel PIX (i,j) in accordance with the level of the voltage to be applied to the pixel electrodes 121a, and therefore a tone display can be achieved.

Followings describe in details a specific structure of an anisotropic scattering sheet 10 disposed in the liquid crystal display unit in the present preferred embodiment, with reference to FIGS. 6 to 10.

Figure 6:
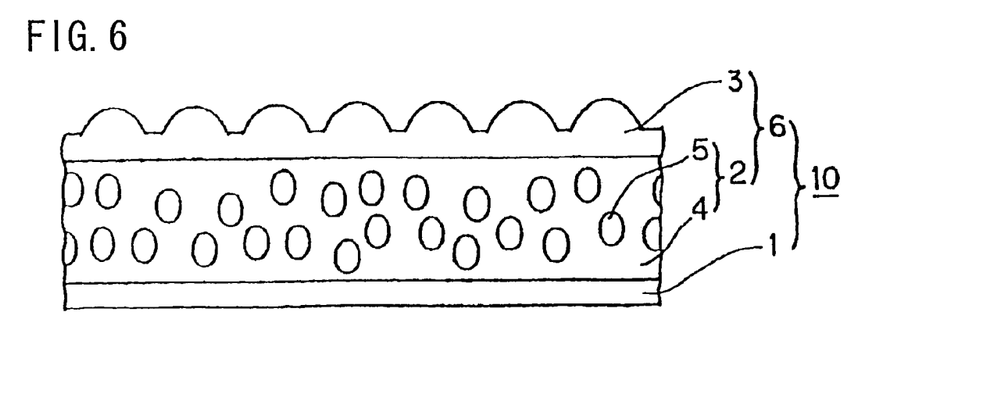
FIG. 6 is a cross section that illustrates an anisotropic scattering sheet included in a liquid crystal display unit according to a preferred embodiment of the present invention.

FIG. 6 is a cross section that illustrates a specific structure of the anisotropic scattering sheet 10 included in the liquid crystal display unit in the present preferred embodiment. As shown in the Figure, the anisotropic scattering sheet 10 includes an antidazzling layer 6 on a transparent substrate 1. The antidazzling layer 6 includes an interior scattering layer 2 and a concavo-convex surface (a layer having a concavo-convex surface) 3, both of which are laminated. In addition, the anisotropic scattering sheet 10 is disposed on the polarizer 113 in the liquid crystal display panel 111.

In the interior scattering layer 2, dispersion material particles 5 having an isotropic shape with a refractive index different from that of the interior scatterings layer 2 is homogeneously dispersed in the transparent matrix 4, in a physical relationship in which the dispersion material particles 5 are moved in parallel and in order.

As foregoing describes, because the antidazzling layer 6 is composed of both the interior scattering layer 2 and the concavo-convex surface 3, a haze caused by the interior scattering layer and a haze caused by a concavo-convex surface can be accurately and independently controlled. Therefore, it becomes possible to design in such a way to give an antidazzling characteristic without decreasing a transparent imaging sharpness.

Anything used as a conventionally known scattering sheet can be employed as the dispersion material particles 5 in the interior scattering layer 2. Examples thereof are silica (SiO2) and acryl beads. In the present preferred embodiment, a material made of an ultraviolet hardening type resin and styrene beads, both of which are prepared by toluene, is used as the interior scattering layer 2.

Figure 7:
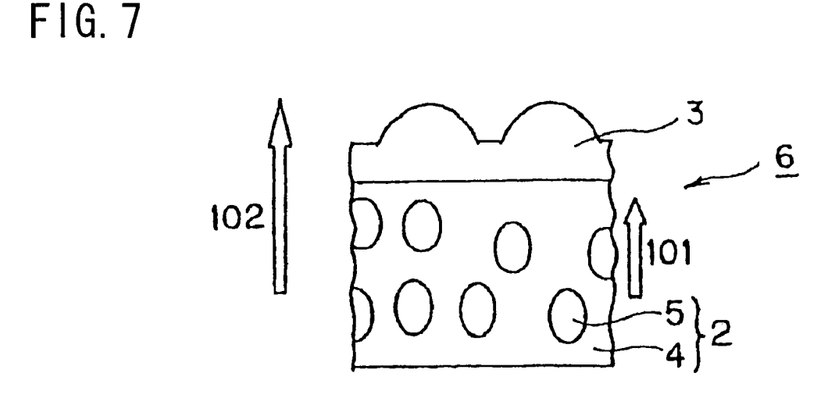
FIG. 7 is a cross section that illustrates a structure of an antidazzling layer included in the anisotropic scattering sheet.

FIG. 7 is a cross section that illustrates a structure of the antidazzling layer 6 in the anisotropic scattering sheet 10, and it indicates a scattering-anisotropic interior scattering layer. As shown in the Figure, in this interior scattering layer 2, spheroid-shaped dispersion material particles 5 are dispersed in the transparent matrix 4 so that its long axial direction, which is indicated by an arrow 101, is almost parallel to the normal line direction, which is indicated by an arrow 102, of the antidazzling layer 6, and furthermore, of the surface of the anisotropic scattering sheet.

Figure 8:
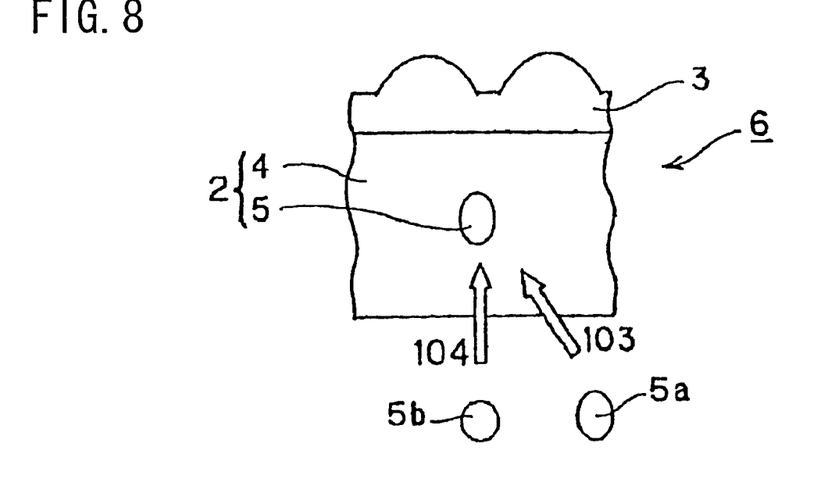
FIG. 8 is a cross section that describes an emergence of scattering-anisotropy in an interior scattering layer included in the anisotropic scattering sheet.
Figure 9:
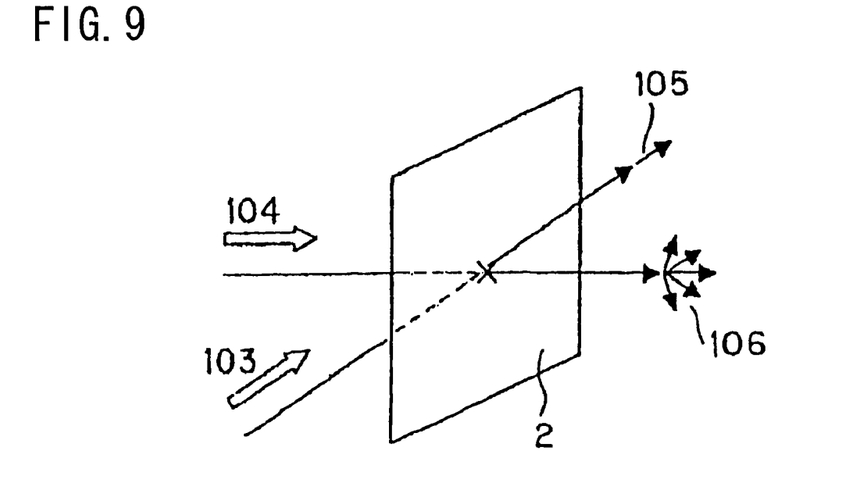
FIG. 9 is a pattern diagram that illustrates a relationship between an interior scattering layer 2 and light going through the interior scattering layer 2.
Figure 10:
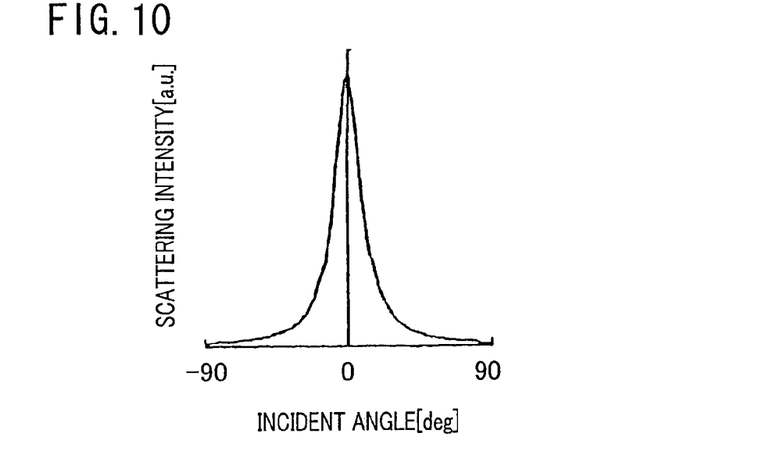
FIG. 10 is a graph that illustrates a: relationship between an incident angle of light entering the anisotropic scattering sheet 10 and a scattering intensity of the passed light, wherein the horizontal axis indicates the incident angle (deg.), and the vertical axis indicates the scattering intensity (a.u.).

Followings describe the dispersivity of the anisotropic scattering sheet 10, with reference to FIGS. 8 to 10. FIG. 8 is a cross section that describes an emergence of the scattering anisotropy in the interior scattering layer. FIG. 9 is a pattern diagram that illustrates a relationship between the interior scattering layer 2 and light going through the interior scattering layer 2. FIG. 10 is a graph that illustrates a relationship between an incident angle of light entering the anisotropic scattering sheet 10 and a scattering intensity thereof after the incidence. The horizontal axis indicates the incident angle (deg.), and the vertical axis indicates the scattering intensity (a.u.).

As shown in FIG. 8, an effective size of the dispersion material particle 5, with respect to light entering the interior scattering layer 2 in an oblique direction which is indicated by an arrow 103, is shown as 5a. An effective size of the dispersion material particle 5, with respect to light entering the interior scattering layer 2 in a front direction which is indicated by an arrow 104, is shown as 5b. Here, the front direction indicated by the arrow 104 is the direction parallel to the normal line direction on the surface of the anisotropic scattering sheet 10. At this time, the effective size 5a is larger than the effective size 5b. Therefore, the scattering property with respect to light entering in the oblique direction is narrower than the scattering property with respect to light entering in the front direction.

Further, as shown in FIG. 9, light entering the interior scattering layer 2 in the front direction that is indicated by the arrow 104 is scattered in the interior scattering layer 2, then it is output as scattered light which is indicated by an arrow 106. On the other hand, light entering the interior scattering layer 2 in the oblique direction that is indicated by the arrow 103 is hardly scattered in the interior scattering layer 2, then it is output simply as parallel-transmitted light which is indicated by an arrow 105.

Further, as shown in FIG. 10, light entering the anisotropic scattering sheet 10 at a 0-degree-angle with respect to the surface of the sheet, specifically, light entering in the front direction has the maximum scattering intensity. In other words, in the anisotropic scattering sheet 10, light entering in the front direction is strongly scattered, while light entering in the oblique direction is weakly scattered.

This implies that the light entering in the oblique direction is hardly scattered and is output as almost-parallel-transmitted light.

Figure 11:
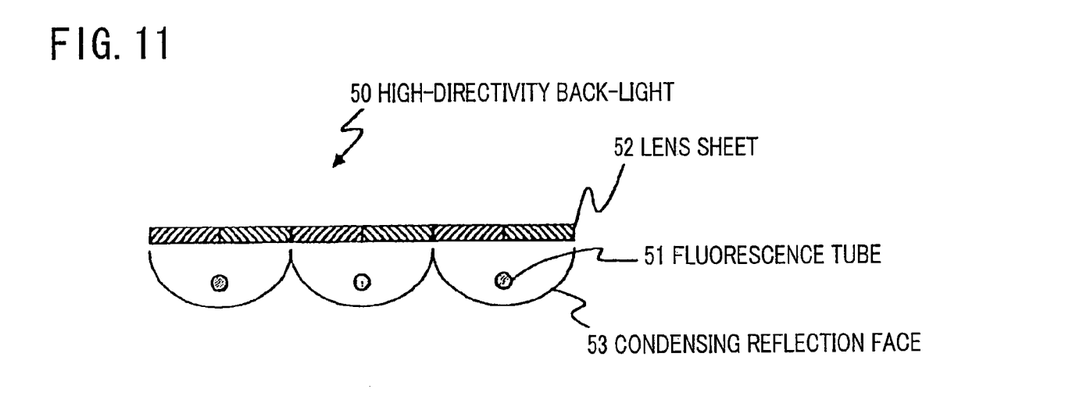
FIG. 11 is a cross section that illustrates a structure of a high-directivity back-light included in the liquid crystal display unit according to a preferred embodiment of the present invention.
Figures 12A, 12B:
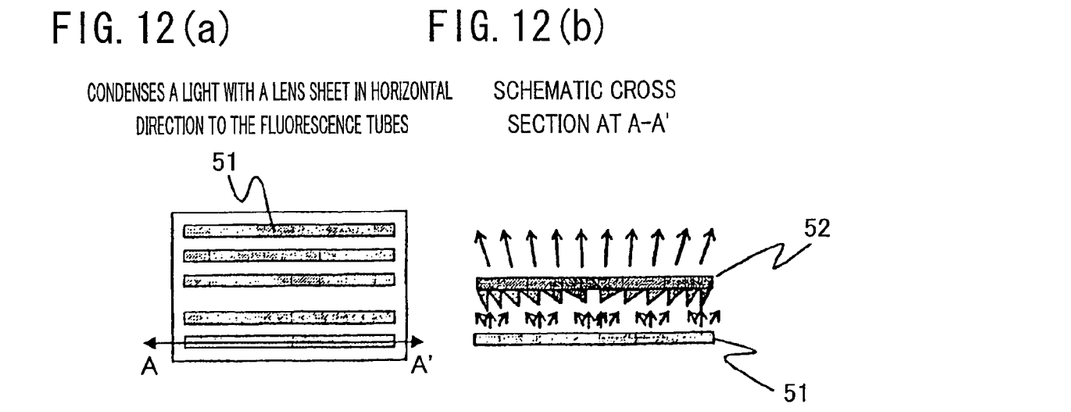
FIG. 12(a) is a plan view that schematically illustrates a structure of the high-directivity back-light in FIG. 11.
FIG. 12(b) is a cross section that schematically illustrates a structure of FIG. 12(a) at A-A'.

Followings describe a specific structure of the high-directivity back-light 50 included in the liquid crystal display unit in the present preferred embodiment, with reference to FIGS. 11 to 13. FIG. 11 is a cross section that shows an example of a structure of the high-directivity back-light 50. FIGS. 12 (a) and 12 (b) are figures that illustrate a structure of the high-directivity back-light 50 in FIG. 11. FIG. 12(a) is a plan view that briefly illustrates the structure of the high-directivity back-light 50, and FIG. 12(b) is a cross section that briefly illustrates the structure of FIG.

Figure 13A:
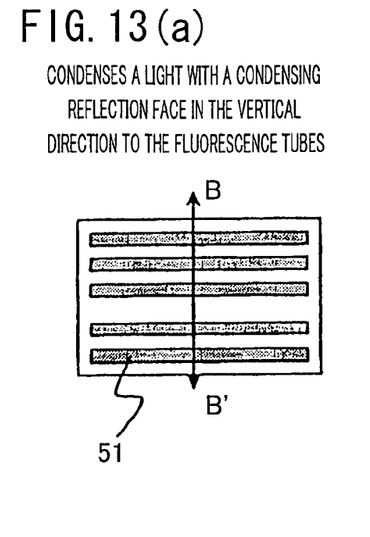
FIG. 13(a) is a plan view that schematically illustrates a structure of the high-directivity back-light in FIG. 11.
Figure 13B:
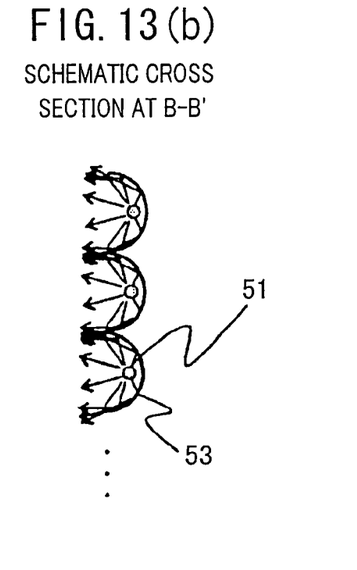
FIG. 13(b) is a cross section that schematically illustrates a structure of FIG. 13(a) at B-B'.

12(a) at A-A'. FIGS. 13(a) and 13(b) are figures that illustrate a structure of the high-directivity back-light 50 in FIG. 11. FIG. 13(a) is a plan view that briefly illustrates the structure of the high-directivity back-light 50, and FIG. 13(b) is a cross section that briefly illustrates the structure of FIG. 13(a) at B-B'.

The high-directivity back-light 50 includes fluorescent tubes 51, a lens sheet 52, and condensing reflection faces (reflectors) 53, as shown in FIG. 11. A plurality of fluorescent tubes 51 are disposed therein, as shown in FIG. 11. The plurality of fluorescent tubes 51 are disposed to be parallel to each other, as shown in FIG. 12(a) and in FIG. 13(a). At the back of the fluorescent tubes 51, condensing reflection faces 53 are disposed. A lens sheet 52 is disposed on that side of the fluorescent tubes 51 opposite to the side on which the condensing reflection faces 53 is disposed. Light output from a fluorescent tube 51 is substantially-parallel light because of the condensing behavior of both of the lens sheet 52 and the condensing reflection face 53.

The lens sheet 52 includes a Fresnel lens portion, as shown in FIG. 12(b). In a cross section at an axis in the length of the fluorescent tube 51, the Fresnel lens portion has longitudinal cuts substantially perpendicular to the axis in along the length of the fluorescent tube 51. The lens sheet 52 including the Fresnel lens portion condenses output light in parallel to the axis along the length of the fluorescent tubes 51 disposed parallel to each other (A-A' direction in FIG. 12(a)).

Further, the condensing reflection face 53 is paraboloid shaped, as shown in FIG. 13(b), and a fluorescent tube 51 is disposed on the focal point. This condensing reflection face 53 condenses output light vertical to the axis in the length of the fluorescent tubes 51 disposed parallel to each other (B-B' direction in FIG. 13(a)).

As foregoing describes, the high-directivity back-light 50 outputs substantially parallel light as a result of the condensing effect of the lens sheet 52 and the condensing reflective faces 53. The structure including the high-directivity back-light 50 that outputs this substantially parallel light and the anisotropic scattering sheet 10 having scattering anisotropy prevent contrast from decreasing, especially in an intermediate tone.

A liquid crystal display panel 111 in a vertical orientation mode, in which the liquid crystal molecules are disposed almost parallel to the substrates when voltage is not applied, is characterized by its high contrast and high-speed response performance. The liquid crystal display panel 111 is applicable to, for example, a DVD for moving images, a playback unit such as a video player, or a display unit such as a television receiver.

In this liquid crystal display panel 111, the light transmittance varies depending upon to what angle the liquid crystal molecules, which are vertically oriented to the substrate surfaces when voltage is not applied, are inclined when voltage is applied. This allows the liquid crystal display panel 111 to achieve an intermediate tone display.

However, focusing on a certain liquid crystal molecule, the transmittance of the light entering in the front direction is different from the transmittance of the light entering in the oblique direction that is inclined at a certain angle with respect to the front direction. Therefore, there is a difference in transmittance between the light observed in: the oblique direction and the light observed in the front direction. Visual angle dependency increases especially when the liquid crystal molecules are vertically oriented and no voltage is applied. Therefore, when the screen is viewed in the oblique direction, the transmittance of the light entering in the oblique direction that is inclined at a certain angle with respect to the front direction becomes higher than the transmittance of the light entering in the front direction. Therefore, in the liquid crystal display panel 111 in a vertical orientation mode, the tone becomes higher than the desired tone (appears whitish), and therefore whitish appearance occurs. This results in a problem of inferior display quality.

This is also caused by increase of transmittance in the direction in which a displacement direction of the inclined liquid crystal molecules matches with the direction of the diffuse transmission light from the back-light. This results in a problem of the inferior display quality in an intermediate display.

However, the above-mentioned problems would not occur if the liquid crystal display panel 111 employs a back-light that can output perfectly parallel light. In other words, if the back-light outputs ideal parallel light, an excellent display quality that is free of dependency on a displacement direction of the liquid crystal molecules and of dependency on a viewing angle (off tone derived in certain viewing directions) can be achieved in an intermediate tone display. It is, however, practically difficult to generate an ideally perfectly parallel light under the present circumstances. Even if that were possible, the cost would be so high that it is, impractical.

In the liquid crystal display unit in the present preferred embodiment, as shown in FIG. 11 and FIG. 13(b), a substantially parallel high-directivity back-light 50 is disposed. Therefore, there is a large amount of light entering the liquid crystal display panel 111 in the oblique direction, though the amount of the light is smaller than that from an ordinary back-light. In view of the above-mentioned problems, the anisotropic scattering sheet 10 is disposed in front of the liquid crystal display panel 111 in the liquid crystal display unit in the present preferred embodiment.

Figure 14:
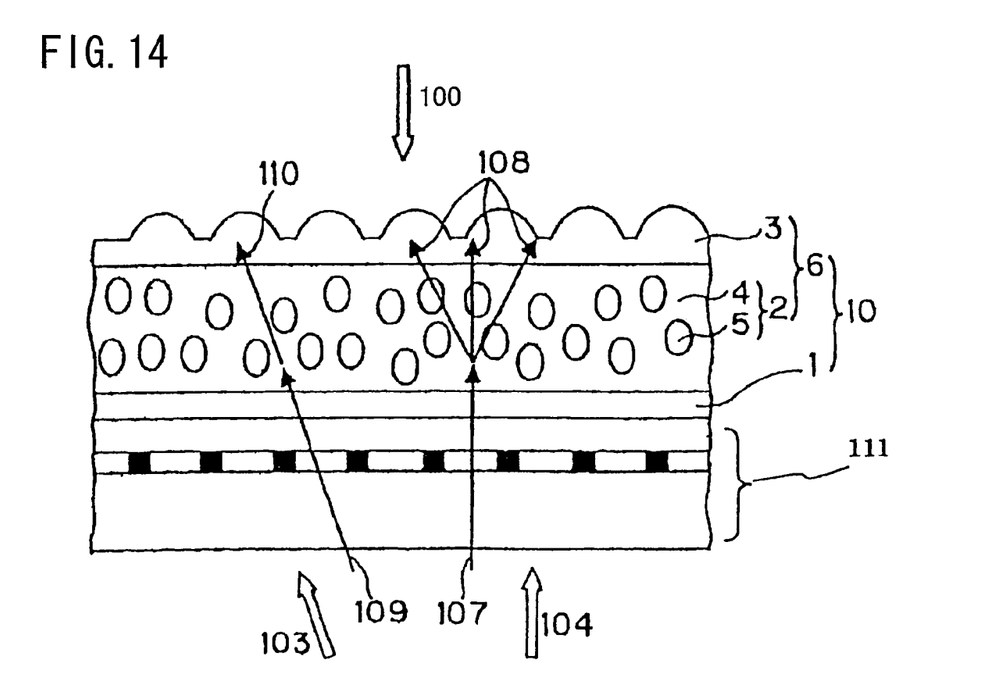
FIG. 14 is a cross section that schematically illustrates a structure of the liquid crystal display unit according to a preferred embodiment of the present invention.

Followings describe a behavior of the light going through the liquid crystal display panel 111 in the liquid crystal display unit in the present preferred embodiment, with reference to FIG. 14. FIG. 14 is a cross section that briefly illustrates a structure of the front side section of the liquid crystal display panel in the liquid crystal-display unit in the present preferred embodiment. In FIG. 14, a polarizer 113 disposed on the front side of the liquid crystal display panel 111 is omitted for convenience.

Assume that the high-directivity back-light 50 outputs substantially parallel light 107 in a front direction which is indicated by an arrow 104, to the liquid crystal display panel 111. The substantially parallel light 107 goes through the liquid crystal display panel 111 and then enters the anisotropic scattering sheet 10. Then, this substantially parallel light 107 is scattered in the interior scattering layer 2 in the anisotropic scattering sheet 10 and then enters a concavo-convex surface 3 as scattered light 108.

In this case, because the light entering a lens formed on the concavo-convex surface 3 is scattered light, generation of scintillation caused by a lens effect of the concavo-convex surface 3 can be restrained.

On the other hand, assume that the high-directivity back-light 50 outputs substantially parallel light 109 in an oblique direction which is indicated by an arrow 103, to the liquid crystal display panel 111. The substantially parallel light 109 likewise goes through the liquid crystal display panel 111 and then enters the anisotropic scattering sheet 10. Then, this substantially parallel light 109 is not scattered in the interior scattering layer 2 in the anisotropic scattering sheet and enters the concavo-convex surface 3 as non-scattered transmitted light 110.

The anisotropic scattering sheet 10 disposed in the liquid crystal display unit in the present preferred embodiment strongly scatters light output in the front direction and from the liquid crystal display panel 111 while weakly scatters light output in the oblique direction. Therefore, to all directions, the anisotropic scattering sheet 10 scatters that light incident in the front direction of the liquid crystal display panel 111, which does not affect the display quality. This allows a viewer to view the display screen of the liquid crystal display panel 111 from a wide range of viewing angles. In addition, the anisotropic scattering sheet 10 does not scatter the light output in the oblique direction, which brings about whitish appearance and lets the light pass as the way it is. This enables the liquid crystal display unit in the present preferred embodiment to prevent the whitish appearance from being viewed.

Further, it is confirmed that a high-directivity back-light 50 that outputs substantially parallel light can prevent the whitish appearance from being viewed even if the back-light 50 outputs substantially parallel light in a direction inclined about 20 degrees with respect to a normal line direction of the display screen of the liquid crystal display panel 11.

In the present preferred embodiment, the fluorescent tube 51 in the high-directivity back-light 50 can be disposed so as to be matched with the length of the longer sides of the display screen on the liquid crystal display panel 111. Disposition of the fluorescent tube 51 to match its length with the length of the display screen of the liquid crystal display panel 111 has a merit such that the number of fluorescent tubes 50 can be reduced. Further, even when viewing is carried out in a horizontal direction in which light is not perfectly parallel (viewing along the length of the display screen of the liquid crystal display panel 111), whitish appearance can be suppressed.

Especially in the case in which the liquid crystal display unit in the present preferred embodiment is applied to a television receiver, even with a relatively simple back-light structure, such as a back-light including the fluorescent tubes 51 and the condensing reflection face 53, whitish appearance can be suppressed when viewing is carried out in a horizontal direction in which the light is not perfectly parallel (viewing along the length of the display screen of the liquid crystal display panel 111). As a result, an excellent display quality can be achieved.

The inventors of the present invention conducted experiments for evaluation of the difference in effects of changes in the spheroid shape of the dispersion material particles. In the consequence of the experiments, it was found that the suppression effect of whitish appearance can be obtained when the ratio between the long axis and the short axis of a spheroid is two or more than two. Further, as the ratio between the long axis and the short axis in creases, the suppression effect of whitish appearance enhances. However, it was also found that in cases where the ratio between the long axis and the short axis of a spheroid exceeds 20, the suppression effect of whitish appearance stagnates.

The present preferred embodiment discloses such an example that deformation of the dispersion material particles 5 into spheroids so as to give the dispersion material particles 5 a scattering anisotropy, but the shape of the dispersion material particle 5 is not to be limited in a spheroid. In other words, the dispersion material particles 5 can take any shapes including a rectangular parallelepiped and a circular cylinder as long as scattering anisotropy is imparted to the dispersion material particles 5.

Figure 15:
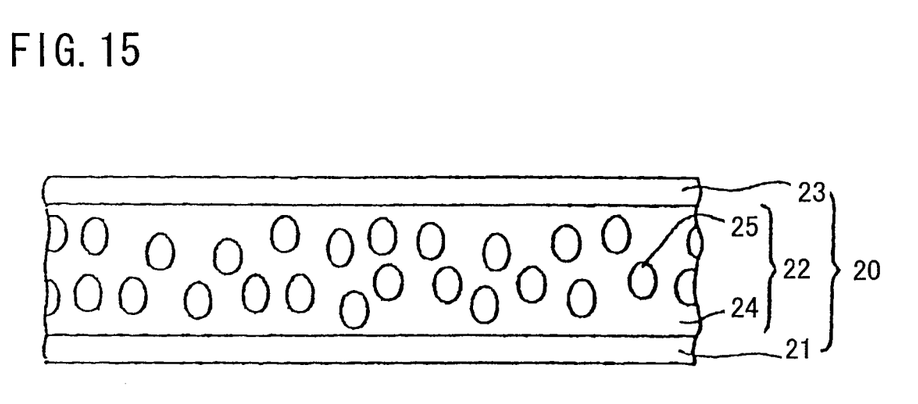
FIG. 15 is a cross section that illustrates another structure of the anisotropic scattering sheet included in the liquid crystal display unit according to a preferred embodiment of the present invention.

Further, the anisotropic scattering sheet included in the liquid crystal display unit in the present preferred embodiment may not include the concavo-convex surface 3. An example of such anisotropic scattering sheet is an anisotropic scattering sheet 20 shown in FIG. 15. FIG. 15 is a cross section that illustrates another structure of an anisotropic scattering sheet included in the liquid crystal display unit in the present preferred embodiment.

As shown in FIG. 15, the anisotropic scattering sheet 20 includes a pair of transparent substrates 21 and 23 opposed to each other and an interior scattering layer 22 tightly held between the transparent substrate 21 and the transparent substrate 23.

In the anisotropic scattering sheet 20, the interior scattering layer 22 is laminated on the transparent substrate 20, and the transparent substrate 23 is further laminated thereon. In the interior scattering layer 22, the dispersion material particles 5 having a refractive index different from that of the interior scattering layer 22 are homogeneously dispersed in the transparent matrix 4 in a physical relationship in which the dispersion material particles 5 are moved in parallel in order. Such anisotropic scattering sheet 20 can be employed also in the liquid crystal display unit in the present preferred embodiment.

As described above, the liquid crystal display unit in the present preferred embodiment is characterized in that the liquid crystal display with an excellent viewing property can be obtained even when the light is not perfectly parallel because the unit includes a scattering-anisotropic optical element having a scattering anisotropy (light entering in a front direction is different in terms of scattering characteristic from light entering in an oblique direction). Therefore, the liquid crystal display unit in the present invention is different from the one disclosed in Japanese Patent Application Publication 2002-372713 in which perfectly parallel light is scattered to all directions after the light goes through the liquid crystal display panel.

The liquid crystal display unit in the present preferred embodiment includes a liquid crystal display panel, a high-directivity back-light that is disposed at the back of the liquid crystal display panel and that lets substantially parallel light enter from the back face of the liquid crystal display panel towards a front of the liquid crystal display panel, and a scattering-anisotropic optical element that is disposed in front of the liquid crystal display panel and that strongly scatters light output in a front direction and from the liquid crystal display panel while weakly scatters light output in an oblique direction. The liquid crystal display unit in the present preferred embodiment is further characterized in that a negative dielectric anisotropic liquid crystal layer is tightly held in between the substrates opposed to each other, and the liquid crystal of the panel is almost vertically oriented to the substrates when voltage is not applied.

This structure increases an allowable range of substantially parallel light and makes it possible to employ an inexpensive back-light, and therefore whitish appearance can be prevented so that display quality is improved.

The liquid crystal display unit in the present preferred embodiment is characterized in that the high-directivity back-light includes a plurality of fluorescent tubes and reflectors, and in that the fluorescent tubes and the reflectors are disposed parallel to the liquid crystal display panel.

This structure allows an inexpensive back-light to be employed and fluorescent tubes to be disposed in parallel to the length of the screen. Besides, whitish appearance can be prevented even in a horizontal direction in which the light is not perfectly parallel.

Further, a television receiver in the present preferred embodiment is characterized in that it includes a liquid crystal display panel, a high-directivity back-light that is disposed at the back of the liquid crystal display panel and that lets substantially parallel light enter from the back face of the liquid crystal display panel toward the liquid crystal display panel, and a scattering-anisotropic optical element that is disposed in front of the liquid crystal display panel and that strongly scatters light output in a front direction and from the liquid crystal display panel while weakly scatters light output in an oblique direction. The television receiver is further characterized in that the liquid crystal display panel is tightly held in between substrates opposed to each other, and the liquid crystal of the panel is almost vertically oriented to the substrates when voltage is not applied, and that a high-directivity back-light includes a plurality of fluorescent tubes and a reflector, and the fluorescent tubes and reflectors are disposed parallel to the liquid crystal display panel.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

As described above, in the present invention, a high-directivity back-light and an anisotropic scattering sheet are used for the light obliquely going through the liquid crystal display panel and thus causing whitish appearance. This allows to employ an inexpensive back-light and to prevent whitish appearance on a panel of vertical orientation, so as to provide a liquid crystal display unit with an improved display quality and a display unit having thereof.

Further, in the liquid crystal display panel in the liquid crystal display unit of the present invention, the liquid crystal molecules are almost vertically oriented with respect to the substrates when voltage is not applied. Therefore, it is characterized by its high contrast and high-speed response performance. Hence, the liquid crystal display unit of the present invention is applicable to, for example, a DVD for moving images, a playback unit such as a video player, or a television receiver.

The invention claimed is:

1. A liquid crystal display unit comprising:
a liquid crystal display panel;
a back-light that outputs light to the liquid crystal display panel; and
a scattering-anisotropic optical element disposed on a side of the liquid crystal display panel which is opposite to the back-light and is arranged such that a scattering intensity of light vertically entering a display screen of the liquid crystal display panel is maximized; wherein
the back-light includes a lens sheet and a plurality of fluorescent tubes and reflectors; and
the lens sheet includes a Fresnel lens portion, and longitudinal cuts of the Fresnel lens portion extend substantially perpendicular to a length of the plurality of fluorescent tubes.

2. A liquid crystal display unit as set forth in claim 1, wherein the plurality of fluorescent tubes and reflectors are disposed substantially parallel to the display screen of the liquid crystal display panel.

3. A liquid crystal display unit as set forth in claim 1, wherein the scattering-anisotropic optical element includes an interior scattering layer having a transparent matrix and dispersion material particles, and a layer having a concavo-convex surface, and in the transparent matrix in the interior scattering layer, the dispersion material particles, each having an anisotropic shape and a refractive index different from a refractive index of the transparent matrix, are arranged so as to be substantially parallel to each other.

4. A liquid crystal display unit as set forth in claim 3, wherein the dispersion material particles are spheroid shaped and are arranged in the transparent matrix so that a long axis of the spheroid-shaped dispersion material particles is vertical relative to the display screen of the liquid crystal display panel.

5. A liquid crystal display unit as set forth in claim 4, wherein a ratio between the long axis and a short axis of the spheroid-shaped dispersion material particles is not less than 2 and not more than 20.

6. A display unit, comprising:
a liquid crystal display panel;
a back-light that outputs light to the liquid crystal display panel; and
a scattering-anisotropic optical element disposed on a side of the liquid crystal display panel which is opposite to the back-light and is arranged such that a scattering intensity of light vertically entering a display screen of the liquid crystal panel is maximized; wherein
the back-light includes a lens sheet and a plurality of fluorescent tubes and reflectors; and
the lens sheet includes a Fresnel lens portion, and longitudinal cuts of the Fresnel lens portion extend substantially perpendicular to a length of the plurality of fluorescent tubes.

7. A display unit as set forth in claim 6, wherein the display unit is a television receiver.

8. A display unit as set forth in claim 6, wherein the display unit is a DVD player.

9. A display unit as set forth in claim 6, wherein the display unit is a video player.

* * * * *